(No Model.)  
2 Sheets—Sheet 1.
A. W. CASTLE & C. U. AKIN.
Elevator.
No. 234,956.  Patented Nov. 30, 1880.
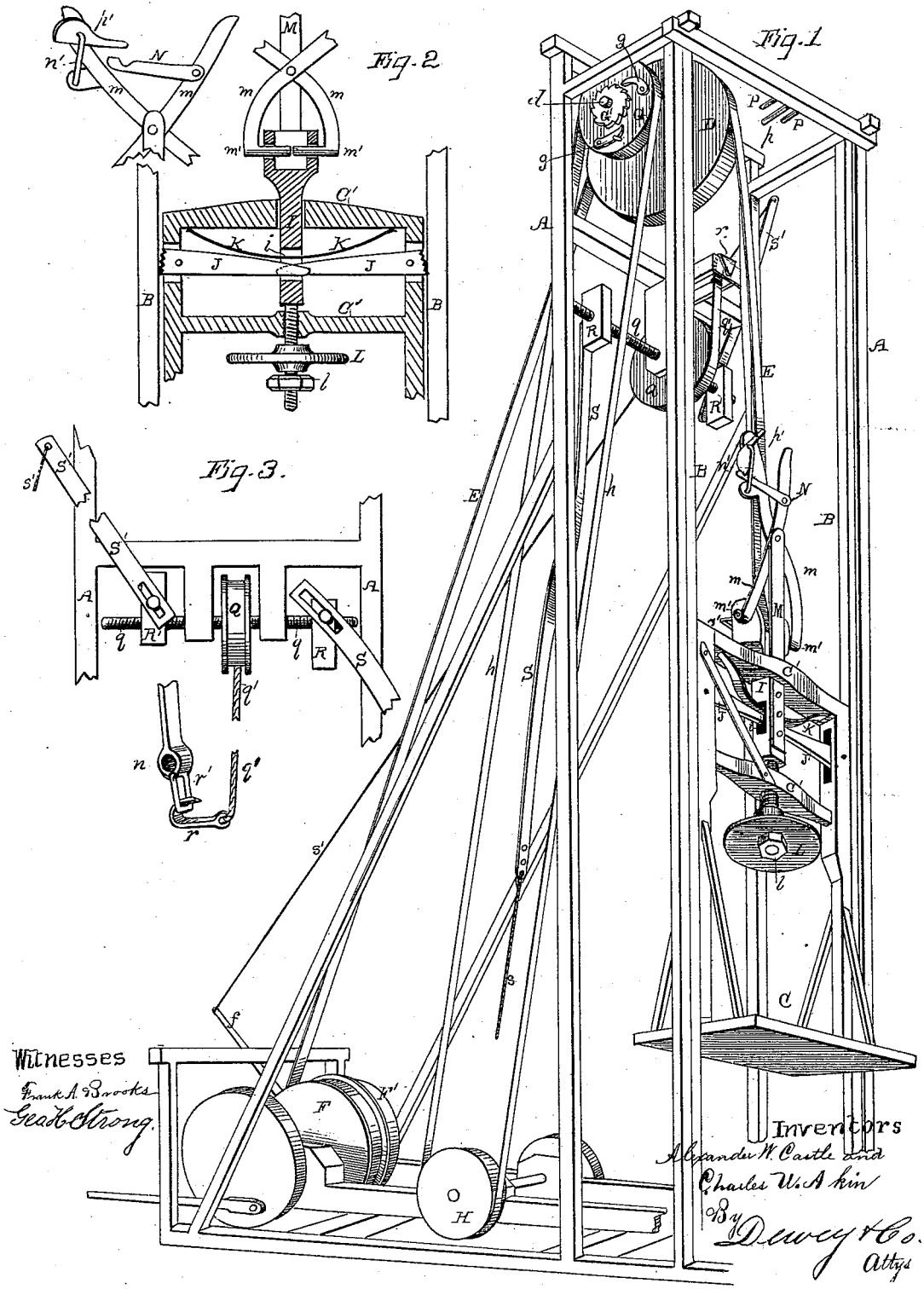
Witnesses  
Frank A. Brooks  
Geo. H. Strong
Inventors  
Alexander W. Castle and  
Charles U. Akin  
By Dewey & Co.  
Atty's (No Model.) 2 Sheets—Sheet 2.
A. W. CASTLE & C. U. AKIN.
Elevator.
No. 234,956. Patented Nov. 30, 1880.
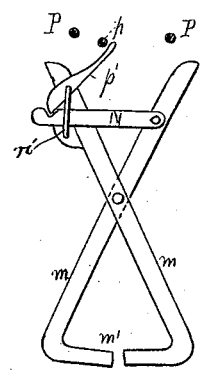
Fig. 4.
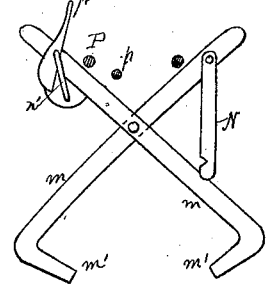
Fig. 5.
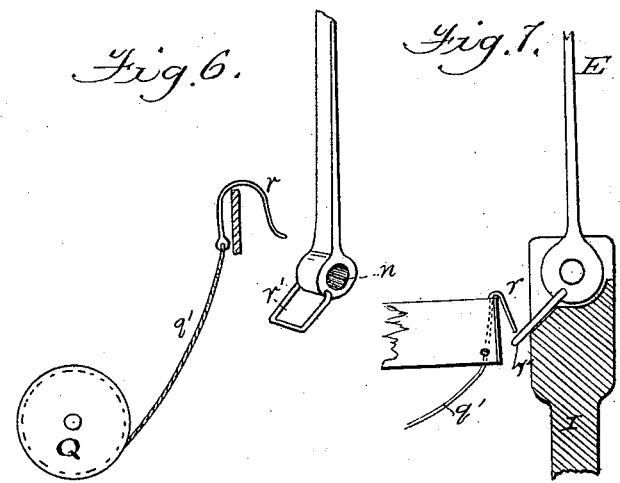
Fig. 6.
Fig. 7.
Witnesses
Geo. H. Strong.
Frank A. Brooks.
Inventors
Alexander W. Castle
and Charles U. Akin
By Dewey & Co.
Attys.

UNITED STATES PATENT OFFICE.

ALEXANDER W. CASTLE AND CHARLES U. AKIN, OF EUREKA, NEVADA.

ELEVATOR.

SPECIFICATION forming part of Letters Patent No. 234,956, dated November 30, 1880.

Application filed May 6, 1880. (No model.)

*To all whom it may concern:*

Be it known that we, ALEXANDER W. CASTLE and CHARLES U. AKIN, of Eureka, county of Eureka, and State of Nevada, have invented an Improved Elevator; and we hereby declare the following to be a full, clear, and exact description thereof.

Our invention relates to certain improvements in safety apparatus for hoisting devices such as are used in mines; and it consists, first, in a means by which the weight of the descending cage is utilized as a source of power for operating some desired machine, and through the means of the governor of such machine regulating the speed of its own descent; second, in a peculiar operating-wheel and lifting-bolt for the cable by which the cage may be stopped by the men in the cage without reference to the engineer on the surface; third, in a peculiarly operated and constructed detaching apparatus for preventing overwinding; and, fourth, in providing a supplemental reel and rope for engaging with the released cable when overwinding occurs, the rotation of this reel by the cable being caused to operate levers which automatically shut off steam from the hoisting-engine and throw on the brake, the engine being thus immediately stopped, as is more fully described in the accompanying drawings, in which—

Figure 1 is a view of my device. Figs. 2 and 3 are details of construction. Figs. 4 and 5 show the detaching device closed and open. Figs. 6 and 7 show the position of the link and hook on the safety device for shutting off steam as they approach each other.

The gallows-frame A is constructed, as usual, at the mouth of the shaft, and the guides B, for the cage C, are extended up on this frame in the customary manner. At the top of the gallows-frame, sustained in suitable bearings, is the supporting-shaft $d$, to which is secured the sheave or pulley D, over which runs the belt or cable E, attached to the cage and leading to the reel F, with which is connected the brake-wheel F', as shown, a brake, $f$, controlling this wheel in the usual manner.

On the shaft $d$ is a loose pulley, G, provided with pawls $g$, for engaging with the ratchet G' on said shaft, so that when the shaft is revolving in one direction the loose pulley G will remain idle; but when revolving in the other direction said pulley will be rotated by the ratchet and pawls for the purpose hereinafter described.

Passing over the pulley G is a belt, $h$, which also passes over the pulley H, this pulley H driving a machine acting under the control of a governor to regulate its speed.

When the cage is being hoisted the belt or rope E will pass over the sheave D and rotate it, and the shaft $d$ will revolve, but the pulley G will remain stationary. On the reverse movement, however, when the cage is being lowered, the ratchets and pawls will engage with the pulley G and rotate it, thus setting into action the belt $h$, which moves the pulley H and starts the machine, which may be an air compressor or pump, with which said pulley is connected.

This machine is provided with a governor (not shown) controlling the speed of the pulley H, and therefore of the cable-sheave D, and the speed of descent of the cage is thus regulated. The downwardly-moving cage, by means of the cable, pulleys, and belts, as described, transmits to the machine with which the pulley H is connected the power required to regulate its own descent.

If several cages are employed in the same elevator they will be operated by cables running over pulleys or sheaves on separable pulley-supporting shafts, and no matter how many cages are running belts from these supporting-shafts may all be connected with pulleys similar to pulley H, on the counter-shaft on which said pulley H is mounted, the power derived from the descent of the several cages being thus utilized for the same object. Thus, with two cages, the one going up as the other goes down, the counter-shaft and the machine which is driven by said shaft will be kept almost constantly running, each loose pulley on the supporting-shaft remaining stationary as its corresponding cage is being hoisted.

In the cross-braces C' of the cage C is the lifting-bolt I, this lifting-bolt being slotted, as shown at $i$, for the ends of safety-catches J and the spring K to pass through. There are two of these catches, which are pivoted in the sides of the cage-frame, their ends being cam-shaped and corrugated, as shown, so that when the inner ends of the lever-catches are depressed by the dropping or drawing down of the lifting-bolt, the cam-shaped ends will engage with the inner edges of the guides and hold the cage, preventing it from falling. When, therefore, the cable breaks or is disengaged from the lifting-bolt, the spring draws the lifting-bolt down, depresses the inner end of the levers, and throws their cam ends into engagement with the edges of the guides, stopping the cage.

The lower end of the lifting-rod is extended below the lower cross-brace of the cage, as shown, and is threaded, having an internally-threaded wheel, L, upon it, and below this wheel is a stop-nut, $l$, as shown. Usually the wheel L will rest upon the stop-nut, and the cage is lifted by the upper surface of the horizontal wheel L coming in contact with the under side of the lower cross-brace, C'. The object of this wheel L on the lifting-rod is to enable the men to stop the cage at any point of its line of travel while descending independently of the engineer. To do this the men in the cage turn the wheel L, which, impinging on the cross-brace, draws the threaded lifting-bar down, thus depressing the inner ends of the safety-catches and forcing their cam ends into engagement with the guides, the same as if the spring operated said catches on the breakage of the cable. This under the present system it is impossible to do, the men being entirely dependent on the movement of the engineer in stopping the cage unless in the event of breakage of cable, when the clamps or catches hold the cage.

Connected with the strap M on the lifting-bar is the rope-holder, which consists of the cross-like centrally-pivoted bars $m\ m$, having keys $m'\ m'$, which pass through holes in the head of the lifting-bar and into a socket or tubular lock, $n$, on the end of the cable. Swiveled to one of the bars $m$ is a snap or latch, N, the other end of which is free and passes into the loop $n'$ on the other arm. On the upper part of this loop is a trigger, $p'$, having its upper end cam-shaped, its lower end catching in a notch in the latch N, which latch holds the upper ends of the bars $m\ m$ together and prevents their lower ends opening to release the cable unless under certain circumstances.

On the gallows-frame are lugs P $p$, in such a position that the center lug, $p$, will strike the trigger $p'$, and by depressing its end disengage it from the notch in the latch N, and the other two lugs P P will then spread the upper ends of the bars $m\ m$ apart, (see Fig. 5,) so as to separate their lower ends, thus drawing out the keys from the socket in the cable, letting the cable go free. The safety-catches then operate and hold the cage in the guides.

The object of this construction is to prevent the cage from being drawn against the sheaves, owing to carelessness of the engineer. When the cage is carried too high the catches, trigger, and bars are operated as described, and the cable is detached from the lifting-bar of the cage.

One danger, aside from that of dropping the cage when this overwinding occurs, is that the engine, being suddenly freed from its load, will attain a high speed, and frequently great damage will be done before it can be stopped. The cable, moreover, will fly over its sheave, and, being drawn suddenly back, sometimes becomes entangled in the engine. When this occurs loss of life sometimes attends the accident, and always a good deal of breakage.

We propose to obviate this danger by providing a means for grasping the strap or cable when the cage is drawn too high, so that when the cage is detached from the cable a grasping device will take the end of the strap or cable, and its own power, by properly connected mechanism, will automatically shut off steam from the engine and throw on the brake, thus preventing the cable from flying back and preventing the engine from running away.

On the gallows-frame under the sheave is a threaded shaft, $q$, on which is a reel, Q, carrying a rope or belt, $q'$, this rope or belt $q'$ having on its end a hook, $r$, adapted to engage with a link, $r'$, on the end of the hoisting-cable. The end of the rope or belt $q'$, carrying the hook, is led to a suitable position to engage with the link $r'$ of the cable, said link lying at all times on the top of the lifting-bar of the cage. Whenever, therefore, the cage is hoisted too high, before the cage-detaching apparatus herein described is operated, the hook and link become engaged, and when the cage is detached from the cable said cable and the rope or belt $q'$ are connected.

On the threaded shaft $q$, carrying the reel Q for the rope or belt $q'$, are two internally-threaded nuts or blocks, R R', one on each end of the shaft. Connected with the nut R is a lever, S, to the lower end of which is a cord, $s$, leading to the throttle-valve of the main hoisting-engine. To the other block R' is connected a lever, S', to the other end of which is fastened the cord $s'$, which leads to the brake $f$ of the brake-wheel F of said hoisting-engine. When the cage is overwound and the rope or belt $q'$ engaged with the cable, as described, as the cable continues to pass up over its sheave it draws the rope or belt $q'$ after it up to the said sheave. This rope or belt $q'$ revolves the reel Q and the threaded shaft $q$. The rotation of this shaft $q$ moves the blocks or nuts R R' along said shaft, thus operating the levers S S' and cords $s\ s'$, throwing on the brake $f$ and closing the throttle of the engine. In this way the engine is prevented from attaining a high speed, since the instant its load (the cage) is disengaged the throttle shuts off the steam and the brake is applied, both operations being performed automatically. No damage, therefore, occurs from the neglect of the engineer or brakeman to stop the engine when the cage reaches the top of the shaft.

We are aware that a supplemental reel provided with a spring and rope has been used to catch the cable when detached from the cage; but this supplemental reel has only been provided with a strong spring, against which the power of the engine was exerted, and no connections were made with brake or throttle. The engine, in pulling against this spring, strains the cable and all its parts, and the device is objectionable for other reasons. We do not, therefore, claim, broadly, a supplemental reel and cable for catching a detached cable; but What we do claim as new, and desire to secure by Letters Patent, is—

1. In an elevator, the combination, with the supporting-shaft $d$, having pulley or sheave D and ratchet-wheel $G'$, both rigidly secured thereto, and pulley G, provided with pawls $g$, loosely mounted thereon, of the cage C, hoisting strap or cable E, and driving-belt $h$, whereby the power derived from the descent of the cage may be utilized, substantially as set forth.

2. The combination, with the cage C, having the cross-bars $C'$, sliding lifting-bolt I, screw-threaded at its lower end, and the safety-catches J, of the wheel L, having an internally-threaded hub, whereby the catches may be operated independently of the action of the hoisting strap or cable, substantially as and for the purpose herein described.

3. The combination, with the frame A, having lugs P $p$, of the lifting-bolt I, safety-catches J, spring K, pivoted bars $m$ $m$, with keys $m'$ $m'$, latch N, loop $n'$, and trigger $p'$, substantially as and for the purpose herein described.

4. The combination, with the pivoted bars $m$ $m$ and the frame A, having lugs P $p$, of the securing-latch N, loop $n'$, and trigger $p'$, whereby said bars are held together until the proper point is reached, and are then separated, substantially as and for the purpose described.

5. In a hoisting apparatus, in combination with a cable or strap, E, having a supplementary link, $r'$, the safety-reel Q, rope or strap $q'$, having engaging-hook $r$, the threaded shaft $q$, nuts or blocks R $R'$, levers S $S'$, and cords $s$ $s'$, adapted to be connected, respectively, with the throttle-valve and brake of the engine, whereby, upon overwinding, the cable is adapted to shut off steam from the engine and throw on the brake, substantially as and for the purpose herein described.

In witness whereof we have hereunto set our hands.

ALEXANDER WILSON CASTLE.
CHARLES URIAL AKIN.

Witnesses:
 GEO. R. AMMOND,
 T. S. DOUGLAS.